July 25, 1939.  L. BOUDIN  2,167,290
APPARATUS FOR THE MANUFACTURE OF GLASSWARE
Filed June 16, 1936

Inventor
Louis Boudin

By Dorsey & Cole
Attorneys

Patented July 25, 1939

2,167,290

UNITED STATES PATENT OFFICE 2,167,290

APPARATUS FOR THE MANUFACTURE OF GLASSWARE

Louis Boudin, Saint-Gobain, France, assignor to Societe Anonyme des Manufactures des Glaces & Produits Chimiques de Saint-Gobain, Chauny & Cirey, Paris, France Application June 16, 1936, Serial No. 85,577
In France June 26, 1935

7 Claims. (Cl. 49—56)

The present invention relates to the manufacture of glassware and particularly of glass sheets, from a tank furnace. It concerns in particular the continuous manufacture of glass sheets by passing in a forming machine the molten glass issued from a tank.

In the manufacture of such glassware the glass must arrive to the working apparatus (forming rollers, suction molds, etc.) with a convenient viscosity corresponding to a determined temperature for each kind of glass. This temperature is below that of the glass in the refining zone of the tank and usually a chamber or gathering zone is interposed between the refining zone and the working or forming apparatus. This chamber is constituted either by an extension of the furnace itself or by a forehearth in which the glass is cooled while flowing from the refining zone.

With the ordinary conditions, this cooling can be realized only slowly and if it is carried out in that manner until the working temperature is attained, the glass is exposed to the risk of devitrification.

In order to avoid this inconvenience, I have already proposed, in my previous United States Patent No. 1,859,862 granted May 24, 1932, to effect rapidly the cooling of the glass from a temperature which is above the devitrification temperature. This is obtained by locating a reservoir between the gathering zone of the furnace and the working or forming apparatus i. e. beteen the issue opening of the furnace and said apparatus, the glass during its travel in said reservoir being cooled at a rapid rate. Thus the glass before issuing from the furnace may be maintained at temperature higher than the devitrification point and the temperature of the glass is afterwards rapidly decreased during the travel between the issue opening of the furnace and the working or forming apparatus. The upper lip of the issue opening constitutes a screen preventing the surface of the glass flow to be exposed to the radiation of the furnace and to the action of the hot gases of the furnace. The reservoir is open at its upper part on the totality of its length so that the glass surface in the reservoir is entirely exposed to the action of the outer atmosphere. The reservoir is constructed with a length determined according to the average values of the different factors acting on the state of the glass at the working apparatus, such as the drop of temperature to be obtained, the importance of the glass flow, etc. In order to modify the cooling action in the reservoir and to effect regulations, for example, when the above mentioned factors vary it has been provided in the previous United States Patent No. 1,859,862 that a fluid at a convenient temperature may be circulated through the inner cavity of a block forming the bottom of the reservoir.

In certain cases, this controlling means has been found insufficient to produce the desirable alterations in the state of the glass at the working machine, said alterations taking sometimes important values.

The present invention avoids this inconvenience. It consists in adjusting the length of the part exposed to the open air of the glass stream contained in the reservoir, according to the value of the cooling to be produced on such glass. In particular this process may be realized by dividing the conditioning reservoir located between the gathering compartment and the working or forming apparatus, with a transversal partition or screen placed partly or totally above the glass flow. The part of the reservoir adjacent to the furnace is covered so as to form a closed compartment in communication with the furnace, such compartment preventing the direct action of the outside air on the glass. The part of the reservoir which is adjacent to the working or forming apparatus is open at its upper part.

Consequently, the rapid cooling is produced only in this second part of the reservoir and according to the present invention the decrease of temperature is controlled by the length of said part i. e. by the position occupied by the partition or screen.

In order to regulate the cooling according to the present invention, the partition or screen may be displaced horizontally along the length of the reservoir and means are provided to adjust, in each position, the cover for the part of the reservoir which is adjacent to the tank.

Further, according to the invention in order to regulate the importance of the radiation from the furnace through the space between the lower part of the partition and the bottom of the reservoir, the partition or screen may be displaced vertically in order that it may penetrate more or less into the stream of glass and even it may be placed slightly out of contact with the glass.

The different characteristics of the invention will appear more clearly in the course of the description of the figures of the drawing which show, by way of example, two forms of realization of an apparatus according to the present invention.

Figure 1:
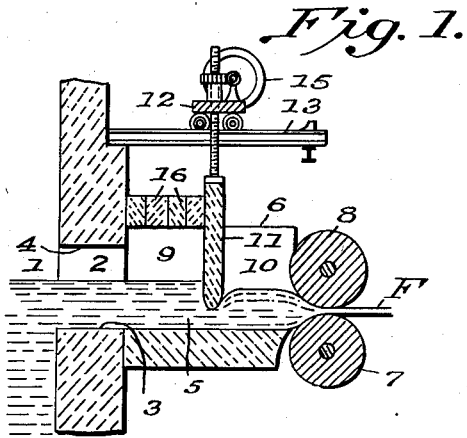
Figure 1 is a vertical section through a structure embodying my invention and adapted to carry out my improved process.
Figure 2:
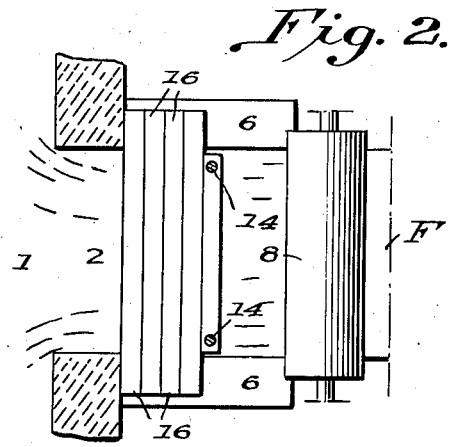
Figure 2 is a corresponding plan view.

As shown on the drawing, in the form of realization of Figures 1 and 2, the tank 1 is provided with an issue opening 2. The lower lip 3 of this opening is immerged in the glass and the upper lip 4 is located at a certain distance above the glass level. This outlet 2 opens in a reservoir 5 which is limited laterally by two side walls 6. At the end of this reservoir is located the working or forming apparatus, for example a pair of forming rollers 7 and 8 which produce continuously a glass sheet F. This reservoir is divided in two parts 9 and 10 by a vertical partition 11, the position of which may be regulated horizontally and vertically. In the drawing is represented a carriage 12 moving along rails 13 and carrying the partition 11 by means of threaded rods 14 actuated by a wheel 15.

The part 9 of the reservoir adjacent to the furnace is covered by refractory blocks 16, resting on the side walls 6; the blocks 16 are adjusted as to their number, size and position according to the position of the vertical partition 11.

The compartment 9 is thus in communication with the furnace, but separated from the surrounding space and the rapid cooling of the glass takes place only in the part 10.

In order to regulate the temperature of the glass when it reaches the working or forming apparatus, the length of the part 10 may be modified. Consequently the partition 11 may be moved horizontally in the convenient direction, after having removed a certain number of blocks 16 if the length of the part 10 is to be increased or, on the contrary, after having added supplementary blocks if the partition is to be spaced further from the furnace.

The longer the part 10, the greater the cooling of the glass in the reservoir before it reaches the working or forming apparatus.

Moreover when moving vertically the partition 11, the glass mass in the compartment 10 and the walls of this compartment are more or less exposed to the radiation of the furnace through the space determined between the lower edge of the partition and the bottom of the reservoir.

In order to increase the effect of the radiation and to have a direct action of the flames of the furnace on the glass flow contained in the compartment 10, it is even possible to place the lower edge of the partition slightly above the level of the glass.

Figure 3:
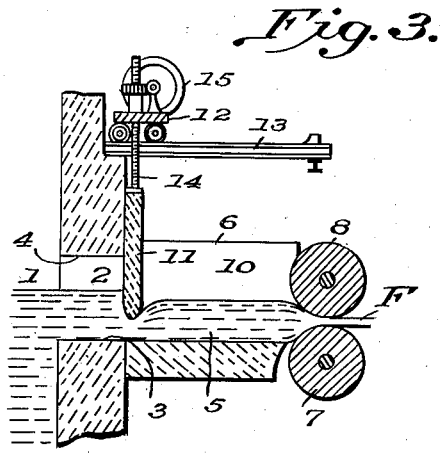
Figures 3 and 4 are two vertical sections similar to that of Figure 1, showing the function of the apparatus.

Figure 3 shows the extreme position of the partition 11 permitting the greatest cooling action. The partition is placed in contact with the furnace and is lowered into the glass mass.

Figure 4:
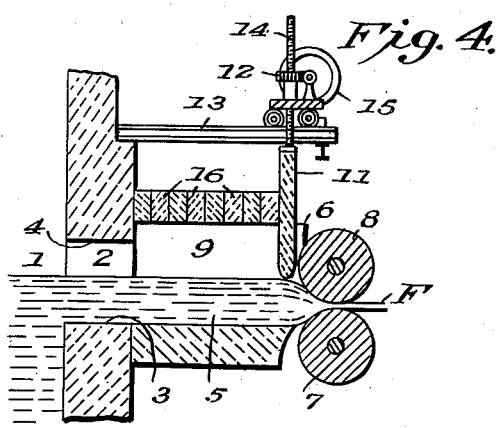

Figure 4 shows the extreme position of the partition 11 corresponding to the smallest cooling action. The partition is brought close to the forming rollers and raised slightly above the glass.

The apparatus represented in Figures 1 to 4 shows a plane partition 11 having its lower edge horizontal. By giving convenient forms to said partition, it is also possible to obtain any desired distribution of temperature along the width of the reservoir. For example, in order to have a temperature of the glass as regular as possible before the forming machine, it is necessary to restrain the cooling of the edges of the stream which always tends to be greater than at the center. For this result, it is possible, as shown in Figure 5, to give to the partition 11a a profile more or less curved in horizontal section, in such a manner that the length of the open compartment is less on both sides of the glass stream than in its axial portion.

Figure 6:
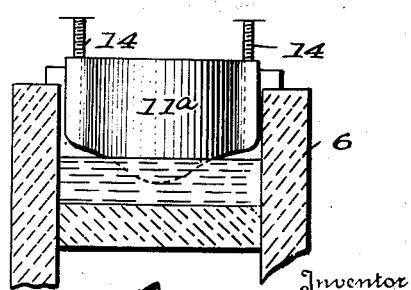
Figure 6 is a vertical section by the line VI—VI of Figure 5.

Similar results may be obtained by giving to the lower edge of the partition a profile such that the distance of penetration in the glass is greater at the center than at the sides. An apparatus with such a partition 11b is shown in Figure 6 in which the lower edge of the partition is curved. In this apparatus the glass at the sides is submitted to the direct action of the flames of the furnace.

Figure 5:
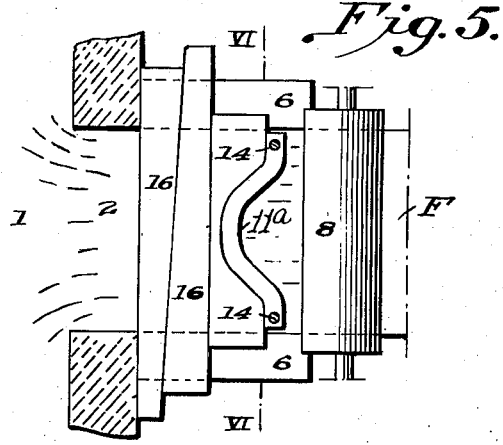
Figure 5 is a plan view of a modified form of the apparatus.

The blocks 16 instead of being removable in order to adjust the length of the zone 9, may be constituted, as shown in Figure 5, by blocks having the form of wedges which may slide on one another, in order to produce the variation of the length of the cover.

The apparatus shown and described hereinabove are given only by way of example and the means for the realization of said apparatus, their form, dimensions and the materials used may be varied in each case without changing the principle of the present invention.

Having thus described my invention what I claim as new, and desire to secure by Letters Patent is:

1. The combination of a glass furnace having an issue opening in the wall thereof, a reservoir external to the furnace and located adjacent said opening, a vertical partition dividing transversely the reservoir into two parts, one of which is exposed to the outside air, means for vertically and horizontally adjusting said partition, a cover for the reservoir between the partition and the furnace said cover comprising a plurality of obliquely cut and slidable elements adjustable to compensate for horizontal movements of said partition, and a forming apparatus located close to that part of the reservoir remote from the furnace.

2. The combination of a glass furnace having an issue opening in the wall thereof, a reservoir external to the furnace and located adjacent said opening, a forming or working apparatus located close to the end of the reservoir remote from the furnace, a vertical partition located between said issue opening and the forming apparatus, means for adjusting the partition vertically and horizontally, and a cover for the first part of the reservoir adjacent to the furnace, and located between the furnace and the partition, the cover being constituted by removable independent elements, the second part of the reservoir being exposed to the action of the outside air.

3. The combination of a glass furnace having an issue opening in the wall thereof, a reservoir external to the furnace and located adjacent said opening, a forming or working apparatus located close to the end of the reservoir remote from the furnace, a vertical partition located between said issue opening and the forming apparatus, means for adjusting the partition vertically and horizontally, said partition dividing transversely the reservoir in two parts, the first part adjacent to the furnace being covered while the other is exposed to the action of the outside air, and the partition having such a horizontal profile that the length of the second part exposed to air is less at its sides than at its center.

4. The combination of a glass furnace having an issue opening in the wall thereof, a reservoir external to the furnace and located adjacent said opening, a forming or working apparatus located close to the end of the reservoir remote from the furnace, a vertical partition located between said issue opening and the forming apparatus, means for adjusting the partition vertically and horizontally, said partition dividing transversely the reservoir in two parts, the first part adjacent to the furnace being covered while the other is exposed to the action of the outside air, and the lower edge of the partition having such a form that the distance between said edge and the bottom of the reservoir is greater at its sides than at its center.

5. The combination of a glass furnace having an issue opening in the wall thereof, a reservoir external to the furnace and located adjacent said opening, a forming or working apparatus located close to the end of the reservoir remote from the furnace, a vertical partition located between said issue opening and the forming apparatus, means for adjusting the partition vertically and horizontally, said partition dividing transversely the reservoir in two parts, the first part adjacent to the furnace being covered while the other is exposed to the action of the outside air, the partition having such a form that the length of the second part exposed to air is less at its sides than at its center and the distance between the lower edge of the partition and the bottom of the reservoir is greater at its sides than at its center.

6. The combination of a glass furnace having an issue opening in the wall thereof, a reservoir external to the furnace and adjacent the issue opening of the tank, a transverse partition dividing the reservoir into two compartments, adjustable means for shielding the compartment adjacent the furnace from the direct action of outside air while leaving the other compartment exposed to the outside air, and means for adjusting relatively the length of the compartments at will.

7. The combination of a glass furnace having an issue opening in the wall thereof, a reservoir external to the furnace and located adjacent said opening, a forming or working apparatus located close to the end of the reservoir remote from the furnace, a vertical partition located between said issue opening and the forming apparatus and dividing transversely the reservoir into two compartments, means for adjusting the partition vertically and horizontally and an adjustable cover for the reservoir located between the partition and the furnace.

LOUIS BOUDIN.